United States Patent [19]
Saaf

[11] Patent Number: 5,771,549
[45] Date of Patent: Jun. 30, 1998

[54] CASKET SHELL STRUCTURES

[75] Inventor: Patrick Michael Saaf, Batesville, Ind.

[73] Assignee: Batesville Casket Company, Inc., Batesville, Ind.

[21] Appl. No.: 669,214

[22] Filed: Jun. 24, 1996

[51] Int. Cl.$^6$ .................................................. A61G 17/013
[52] U.S. Cl. ....................................................... 27/4; 27/10
[58] Field of Search ................................. 27/2, 4, 10, 35; 229/186, 187, 178, 179; 428/116, 118

[56]          References Cited

U.S. PATENT DOCUMENTS

| | | |
|---|---|---|
| D. 227,247 | 6/1973 | Dittbenner . |
| 768,481 | 8/1904 | Post . |
| 1,003,510 | 9/1911 | Reber . |
| 1,887,665 | 11/1932 | Truman . |
| 3,490,114 | 1/1970 | Connelly et al. . |
| 3,574,906 | 4/1971 | Rittenhouse . |
| 3,729,786 | 5/1973 | Walding . |
| 3,782,619 | 1/1974 | Dittbenner . |
| 3,969,798 | 7/1976 | Sahlin . |
| 4,063,337 | 12/1977 | Havey, III . |
| 4,123,831 | 11/1978 | Covington . |
| 4,151,630 | 5/1979 | Havey . |
| 4,154,388 | 5/1979 | Hall . |
| 4,156,956 | 6/1979 | Partridge et al. . |
| 4,170,054 | 10/1979 | Ruffner et al. . |
| 4,176,431 | 12/1979 | Havey, III . |
| 4,209,880 | 7/1980 | Lidholm . |
| 4,399,596 | 8/1983 | Parlour et al. . |
| 4,730,370 | 3/1988 | Elder . |
| 4,773,134 | 9/1988 | Kay . |
| 4,800,631 | 1/1989 | Pellmann . |
| 4,891,869 | 1/1990 | Nutting . |
| 4,902,365 | 2/1990 | Westlake, Sr. . |
| 4,967,455 | 11/1990 | Elder . |
| 4,990,391 | 2/1991 | Veta et al. . |
| 5,035,032 | 7/1991 | Nutting . |
| 5,106,668 | 4/1992 | Turner et al. . |
| 5,111,559 | 5/1992 | Mohr et al. . |
| 5,307,545 | 5/1994 | Stoltz . |
| 5,353,484 | 10/1994 | Woedl et al. . |

FOREIGN PATENT DOCUMENTS

| | | |
|---|---|---|
| Hei 54-11071 | 8/1979 | Japan . |
| Hei 62-116674 | 7/1987 | Japan . |
| Hei 63-88322 | 6/1988 | Japan . |
| Hei 2-88629 | 7/1990 | Japan . |
| Hei 3-198852 | 8/1991 | Japan . |
| Hei 3-88517 | 9/1991 | Japan . |
| Hei 4-3729 | 1/1992 | Japan . |
| Hei 4-3730 | 1/1992 | Japan . |
| Hei 4-22934 | 2/1992 | Japan . |
| Hei 4-65534 | 6/1992 | Japan . |
| 1 535 188 | 12/1978 | United Kingdom . |

*Primary Examiner*—Kien T. Nguyen
*Attorney, Agent, or Firm*—Barnes & Thronburg

[57]          ABSTRACT

A casket shell comprises an elongated inner box and an elongated outer box. The inner box is congruently disposed in the interior region of the outer box and a core is sandwiched between the inner and outer boxes. The core includes a top surface attached to the inner box and a bottom surface attached to the outer box. The core can be made form a closed-celled material or a honeycomb material having a plurality of interconnected cylinders. Both inner and outer boxes are foldable to a generally planar configuration to minimize the volume during shipment. A casket shell in accordance with the present invention can also include a plurality of panels, each panel includes a core having a top surface and a bottom surface, first and second stabilizing surface element attached to the bottom and top surfaces, respectively. The panels connected together by a plurality of connectors to define the casket shell.

25 Claims, 5 Drawing Sheets

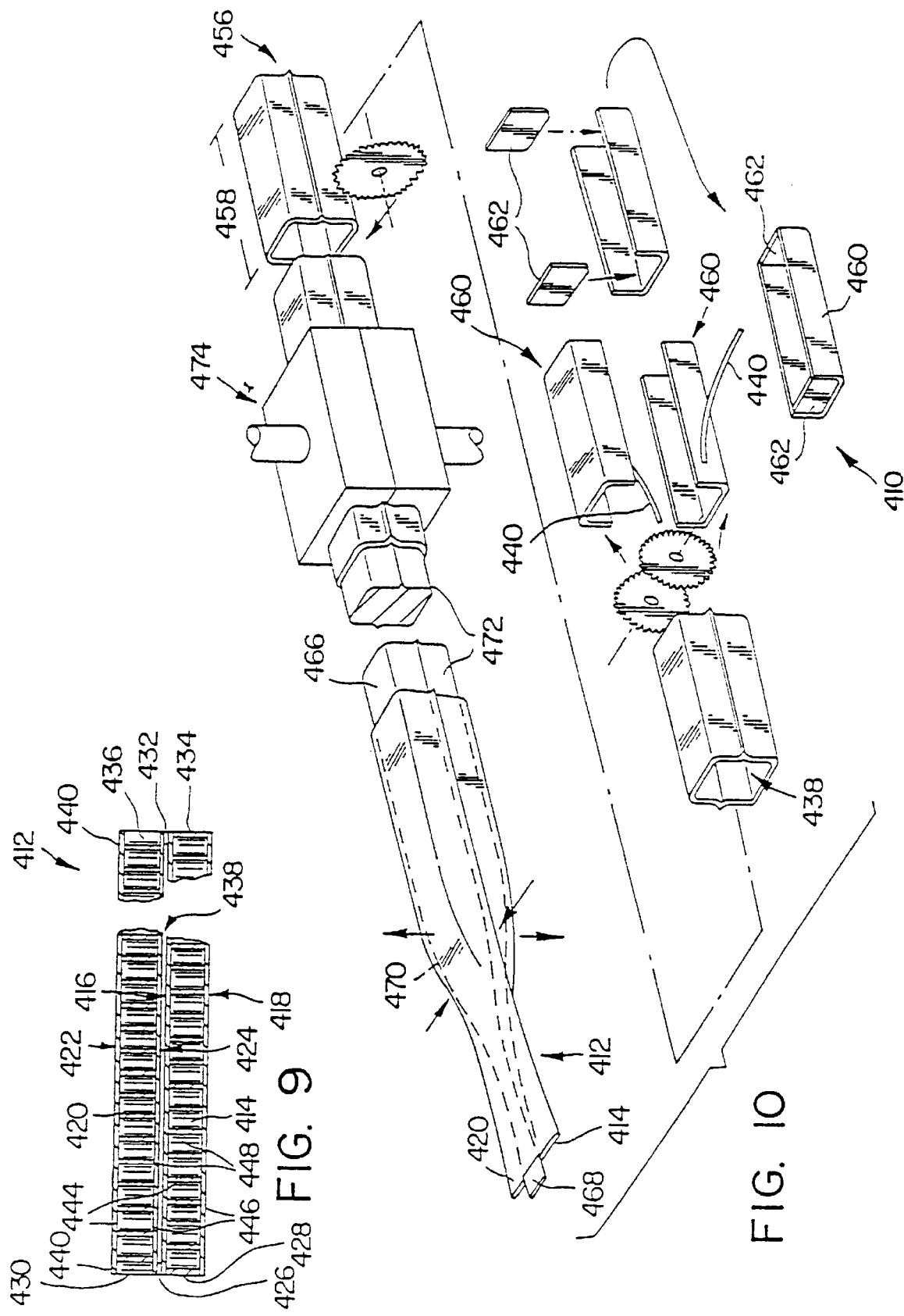

CASKET SHELL STRUCTURES

BACKGROUND AND SUMMARY OF INVENTION

The present invention relates to caskets, and particularly to casket shell structures. More particularly, the present invention relates to casket shell structures including panels, each of which has a first stabilizing surface element, a second stabilizing surface element spaced apart from the first stabilizing surface element, and a core sandwiched therebetween. The core has a first surface attached to the first stabilizing surface element and a second surface attached to the second stabilizing surface element so that forces applied to the first stabilizing surface element are transferred through the core to the second stabilizing surface element.

The disposal of the remains of the deceased can be accomplished by several means including burial and cremation. Providing a casket made from light weight and inexpensive material such as corrugated cardboard or the like for the disposal of such remains is known in the art. For example, U.S. Pat. Nos. 3,969,798 to Sahlin; 4,967,455 to Elder; 5,353,484 to Woedl et al.; 4,944,076 to Kay et al.; 4,733,134 to Kay; and 4,730,370 to Elder all disclosed caskets that can be made from light weight materials.

It is also known to construct a casket shell from a blank comprising a core having a bottom surface and a top surface, a first stabilizing surface element attached to the bottom surface, and a second stabilizing surface element attached to the top surface. Such cores can be made from closed-celled materials such as polystyrene or from open-celled materials such as honeycomb material including a plurality of cylindrically-shaped cells, each of which has an axis in generally orthogonal relation to the first and second stabilizing surface elements. For example, U.S. patent application Ser. Nos. 08/495,323 filed Jun. 27, 1995 and 08/589,822 filed Jan. 22, 1996, both to Tambussi, each discloses casket shells made from these materials. In addition, Japanese Publications Hei 3[1991]-198852; Hei 3[1991]-88517; Hei 4[1992]-3729; and Hei 4[1992]-3730, all to Takashi Makino, all disclose caskets including panels made from honeycomb material.

What is needed is a lightweight casket made from panels having a first stabilizing surface element, a second stabilizing surface element, and a core sandwiched therebetween that can be easily and readily constructed. Manufacturers and retailers would appreciate such casket shells that can be shipped in the form of one or more generally planar blanks and that can be easily formed and assembled near the point of sale or near the point of delivery into the shape of the casket shell. Manufacturers, retailers, and consumers would additionally appreciate such a casket shell that can be constructed at a low cost.

According to the present invention a casket shell is provided. The casket shell includes an elongated inner box of unitary construction having a generally horizontal bottom panel. The bottom panel includes a head end edge, a foot end edge longitudinally spaced-apart from the head end edge, spaced-apart first and second side edges extending longitudinally between the head and foot end edges, and head end, foot end, first side, and second side panels integrally appended to the bottom panel at the head end, foot end, first side, and second side edges, respectively, and extending upwardly therefrom.

The casket shell also includes an elongated outer box of unitary construction having a generally horizontal bottom panel. The bottom panel includes a longitudinally-extending first side edge and a longitudinally-extending second side edge spaced apart from the first side edge. First and second side panels are appended to the first and second side edges of the bottom panel, respectively, and extend upwardly therefrom. Each of the first and second side panels of the outer box have a head end edge and a foot end edge. A head end panel is integrally appended to the head end edges of each of the first and second side panels and extends therebetween and a foot end panel is integrally appended to the foot end edges of each of the first and second side panels and extends therebetween. The bottom panel, first and second side panels, and head and foot end panels of the outer box define an interior region of the outer box.

The inner box is congruently disposed in the interior region of the outer box and a core is sandwiched between the inner box and the outer box. The core includes a top surface attached to the inner box and a bottom surface attached to the outer box to stabilize and strengthen the core and the casket shell.

In preferred embodiments, the casket structure includes a panel having a first stabilizing surface element, a second stabilizing surface element spaced apart from the first stabilizing surface element, and a core sandwiched therebetween and attached to each of the first and second stabilizing surface elements so that forces directed against one of the stabilizing surface elements are transferred through the core to the other of the stabilizing surface elements. The core can be made from either a closed-celled material such as polystyrene foam or, preferably, from a honeycomb material having a plurality of interconnected cylinders, the side walls of which are in generally orthogonal relation to the first and second stabilizing surface elements.

The preferred first stabilizing surface element is shaped as an inner box and the preferred second stabilizing surface element is shaped as an outer box. The core can include a plurality of core panels sandwiched therebetween or the core can be made from a foldable core blank that can be folded to the shape of a box sandwiched between the inner box and the outer box.

Preferably, both of the inner and outer boxes are foldable to a generally planar configuration to minimize the volume of each of the inner and outer boxes during shipment. The preferred inner box includes score lines at which the inner box folds and the outer box includes score lines at which the outer box folds, the score lines of the outer box being positioned to lie away from the score lines of the inner box so that the inner and outer boxes tend to hold one another open after assembly. For example, the inner box can include score lines allowing the head and foot end panels and the first and second side panels of the inner box to collapse outwardly to a generally planar blank for shipment and the outer box can include score lines allowing the head and foot end panels and the first and second side panels of the outer box to collapse inwardly to a generally planar blank for shipment. When the casket shell is assembled for use, the outer box and the core will prevent the inner box from collapsing outwardly and the inner box and the core will prevent the outer box from collapsing inwardly.

Also if desired, the inner box can be provided with a plurality of slots and the outer box can be provided with a plurality of tabs which are received by the slots of the inner box after assembly of the casket shell so that the tabs of the outer box cooperate with the inner box adjacent to the slots to maintain the structural integrity of the casket shell. In addition, the outer box can be provided with flaps that can be adhered to adjacent panels of the outer box to provide additional structural integrity to the casket shell. Of course, if desired, the outer box can be provided with the plurality of slots and the inner box can be provided with the plurality of tabs which are received by the slots of the outer box after assembly of the casket, however this arrangement may only be preferred when the outer box is provided with an external outer covering to disguise or hide the tabs and slots.

Thus, a method is provided for constructing a casket shell. The method includes the steps of providing a generally planar first blank and folding the first blank to form an inner box. The method also includes the steps of providing a generally planar second blank and folding the second blank to form an outer box. In addition, the method includes the steps of providing a core, placing the core into the outer box, and placing the inner box into the outer box so that the core is sandwiched between the inner box and the outer box.

If desired, an adhesion blanket can be positioned to lie between the core and the outer box and between the core and the inner box. The preferred adhesion blanket includes a wire mesh and thermally-activated adhesive surrounding, and preferably coating, the wire mesh. When an electrical current passes through the wire mesh, the temperature of the wires of the wire mesh increase, increasing the temperature of the adhesive until the thermally-activated adhesive is activated to adhere the core to the inner and outer boxes. Use of the thermally-activated adhesive blanket increases the ease of handling the core, the inner box, and the outer box prior to assembly of the casket shell and the ease of assembly of the casket shell.

A casket shell can also be constructed from a plurality of generally planar panels, each of which includes a first stabilizing surface element, a second stabilizing surface element spaced apart from the first stabilizing surface element, and a core sandwiched therebetween. Such a casket shell also includes a plurality of elongated connectors, each elongated connector including a longitudinally-extending first portion and a longitudinally-extending second portion connected to the first portion. Preferably, each of the first and second portions define a channel receiving a panel of the casket shell and each portion includes an inwardly directed barb engaging the panel to hold the panel in the channel. Preferred connectors are made from an extruded material. If desired, the first portion can be pivotally connected to the second portion so that the panels connected thereto can pivot relative to one another.

Casket shells can also be made from a casket shell precursor blank including a first elongated panel having a top surface, a bottom surface, a first longitudinally-extending side, and a second longitudinally-extending side. The precursor blank also includes a second elongated panel having a top surface, a bottom surface, a first longitudinally-extending side, and a second longitudinally-extending side. The second panel is positioned to lie above the first panel and is adhered thereto by elongated spaced-apart first and second adhesive strips. The top surface of the first panel is adhered to the bottom surface of the second panel by the first strip of adhesive, which is adhered to the first side of the top surface of the first panel and to the first side of the bottom surface of the second panel, and by the second strip of adhesive, which is adhered to the second side of the top surface of the first panel and to the second side of the bottom surface of the second panel. The top surface of the first panel and the bottom surface of the second panel cooperate to define an interior region of the casket shell precursor positioned to lie between the first and second panels.

The first and second panels are flexible and the casket shell can be formed by inserting a form into the interior region of the precursor to expand and shape the precursor to the desired shape and curing the precursor adjacent to the form. Once the precursor is cured so that the precursor retains the shape of the form, the precursor is divided to form a shaped unit having a desired length. The first and second sides of each of the first and second panels are then removed from the shaped unit so that the shaped portions of the first and second panels can be separated to form first and second shell portions. First and second casket shells are completed by installing end caps onto the ends of each shell portion.

Thus, a casket shell in accordance with the present invention can include an inner box, an outer box, and a core sandwiched therebetween. The core includes an inner surface and an outer surface spaced apart from the inner surface. The inner box is adhered to the inner surface and the outer box is adhered to the outer surface so that pressure is transferred from the inner box to the outer box when a force is applied to the inner box.

A casket shell in accordance with the present invention can also include an inner box having an elongated bottom panel, longitudinally spaced-apart first and second end panels attached to the bottom panel and extending upwardly therefrom, and longitudinally-extending first and second side panels attached to the bottom and extending upwardly therefrom. The casket shell also includes a core having an outer surface and an inner surface spaced apart from the outer surface and attached to the inner box. An outer box is attached to the outer surface of the core. The outer box includes first and second end panels engaging the core and wrapping around the core to engage the first and second end panels, respectively, of the inner box. The outer box also includes longitudinally spaced-apart head and foot end panels engaging the core and wrapping around the core to engage the head and foot end panels, respectively, of the inner box.

A casket shell in accordance with the present invention can also include a plurality of generally planar panels. Each panel includes a core having a top surface and a bottom surface spaced apart from the top surface, a first stabilizing surface element attached to the bottom surface of the core, and a second stabilizing surface element attached to the top surface of the core. The casket shell also includes a plurality of connectors. Each connector couples two panels of the plurality of panels to one another. The plurality of panels cooperate with the plurality of connectors to define the casket shell.

A precursor for a casket shell can include an elongated flexible first panel having a top surface, a bottom surface, a longitudinally-extending first side, and a longitudinally-extending second side spaced-apart from the first side. An elongated flexible second panel having a top surface, a bottom surface, a longitudinally-extending first side, and a longitudinally-extending second side spaced apart from the first side is attached to the first panel. The first side of the first panel is adhered to the first side of the second panel and the second side of the first panel is adhered to the second side of the second panel so that the top surface of the first panel engages the bottom surface of the second panel.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which:

FIG. 9 is a front elevation view of a precursor of a fourth embodiment of a casket shell showing a first panel having a first stabilizing surface element, a second stabilizing surface element spaced apart from the first stabilizing surface element, and a core sandwiched therebetween, a second panel having a first stabilizing surface element, a second stabilizing surface element spaced apart from the first stabilizing surface element, and a core sandwiched therebetween, the second panel being adhered to the first panel by longitudinally-extending and transversely spaced-apart first and second adhesive strips so that a top surface of the first panel engages a bottom surface of the second panel and the first and second panels cooperate to define an interior region of the precursor therebetween; and FIG. 10 is a diagrammatic view of a process for forming casket shells from the precursor of FIG. 9 showing a form received in the interior region of the precursor for expanding and shaping the precursor, a curing station for curing adhesive of the precursor which is positioned to lie between the core of each panel and the respective first stabilizing surface element and the second stabilizing surface element of each panel, a cutter for dividing the precursor into a plurality of shaped units, each shaped unit having a desired length, a pair of cutters for removing first and second sides of each panel and removing the first and second adhesive strips adhered thereto so that each shaped unit is separated into a pair of opposing shell portions, and a pair of end caps installed into each shell portion to form the casket shells therefrom.

DETAILED DESCRIPTION OF THE DRAWINGS

Figure 8:
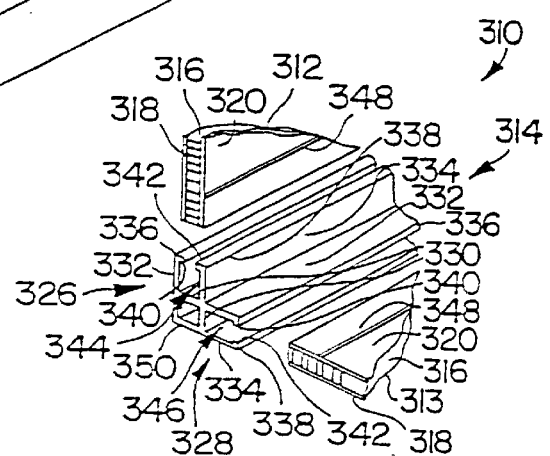
FIG. 8 is an exploded perspective view of a third embodiment of a casket shell structure showing first and second casket shell panels and a connector for connecting the first panel to the second panel.

First and second embodiments of a casket shell 10, 210 in accordance with the present invention include an inner box 12, 212, an outer box 14, 214 and a core 16, 116 sandwiched therebetween as shown in FIGS. 1–7. A third embodiment of a casket shell 310 in accordance with the present invention includes a plurality of generally planar casket shell panels 312, 313 and a plurality of connectors 314 that cooperate with panels 312, 313 to define casket shell 310 as shown in FIG. 8. A fourth embodiment of a casket shell 410 in accordance with the present invention is made from a casket shell precursor 412, shown in FIG. 9, using a process shown diagrammatically in FIG. 10.

Figure 1:
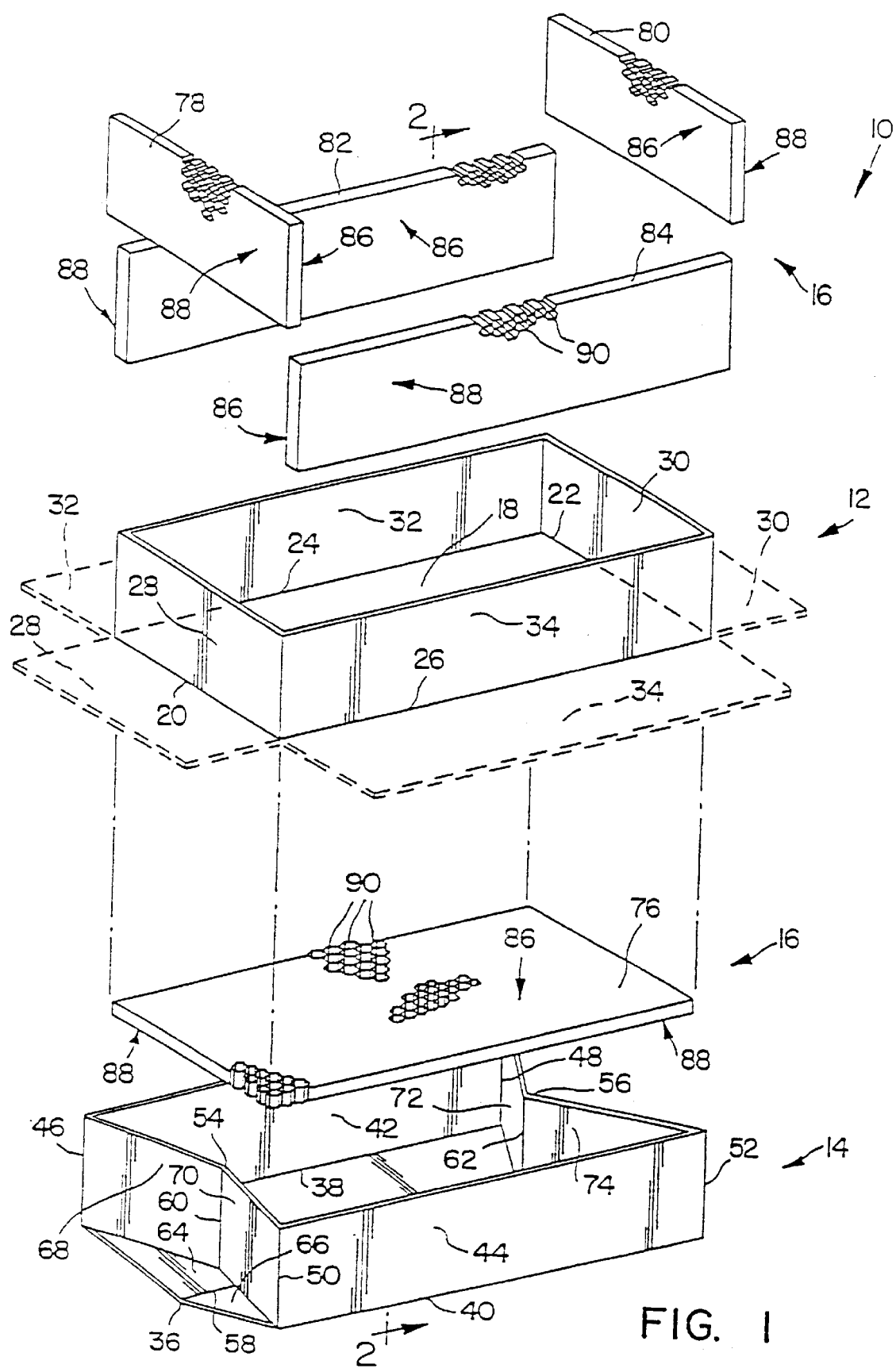
FIG. 1 is an exploded perspective view of a first embodiment of a casket shell structure in accordance with the present invention showing an elongated foldable outer box positioned to lie beneath a bottom panel of a honeycomb core, an elongated foldable inner box made from a blank (in phantom) that is adhered to the bottom panel of the honeycomb core, the honeycomb core also including a head end panel, a foot end panel longitudinally spaced apart from the head end panel of the honeycomb core, and spaced-apart first and second side panels extending therebetween, the panels of the honeycomb core being sandwiched between the inner and outer boxes.

First embodiment of casket shell 10 includes inner box 12 having an elongated bottom panel 18 including a head end edge 20, a foot end edge 22 longitudinally spaced apart from head end edge 20, an elongated first side edge 24, and an elongated second side edge 26 as shown in FIG. 1. Inner box 12 also includes a head end panel 28 appended to bottom panel 18 at head end edge 20, a foot end panel 30 appended to bottom panel 18 at foot end edge 22, a first side panel 32 appended to bottom panel 18 at first side edge 24, and a second side panel 34 appended to bottom panel 18 at second side edge 26. In preferred embodiments, inner box 12 assumes a generally planar configuration defining a generally planar blank that can be formed into inner box 12 to minimize the volume of inner box 12 during shipment. Inner box 12 is moved from the generally planar configuration (in phantom) to an open configuration by folding each of the head and foot end panels 28, 30 and the first and second side panels 32, 34 upwardly along score lines defined at edges 20, 22, 24, 26.

Outer box 14 includes an elongated bottom panel 36 defining a longitudinally-extending first side edge 38 and a longitudinally-extending second side edge 40 transversely spaced apart from first side edge 38 as shown in FIG. 1. A first side panel 42 is appended to bottom panel 36 of outer box 14 at first side edge 38 and extends upwardly therefrom. A second side panel 44 is appended to bottom panel 36 of outer box 14 at second side edge 40 and extends upwardly therefrom. Each of first side panel 42 and second side panel 44 includes a head end edge 46, 50, respectively, and a foot end edge 48, 52, respectively.

A head end panel 54 of outer box 14 is appended to both head end edge 46 of first side panel 42 and head end edge 50 of second side panel 44 as shown in FIG. 1. A foot end panel 56 is appended to both foot end edge 48 of first side panel 42 and foot end edge 52 of second side panel 44 so that foot end panel is longitudinally spaced apart from head end panel 54.

Bottom panel 36 is formed to include a longitudinally-extending score line 58 dividing bottom panel 36 into a first portion 64 and a second portion 66 as shown in FIG. 1. Likewise, head end panel 54 is formed to include a generally vertically-extending score line 60 dividing head end panel 54 into a first portion 68 and a second portion 70 and foot end panel 56 is formed to include a generally vertically-extending score line 62 dividing foot end panel 66 into a first portion 72 and a second portion 74.

Score lines 58, 60, 62 facilitate the folding of outer box 14 as shown in FIG. 1 from an open configuration to a generally planar configuration defining a generally planar blank that can be formed into outer box 14 to minimize the volume of outer box 14 during shipment. In the illustrative and preferred embodiment, bottom panel 36 folds downwardly at score line 58 so that first portion 64 of bottom panel 36 engages second portion 66 of bottom panel 36 when outer box 14 is in the generally planar configuration. Likewise, score line 60 of preferred outer box 14 folds inwardly so that first portion 68 of head end panel 54 engages second portion 70 of head end panel 54 and score line 62 of preferred outer box 14 folds inwardly so that first portion 72 of foot end panel 56 engages second portion 74 of foot end panel 56 when outer box 14 is in the generally planar configuration.

It can be seen that outer box 14 is opened by folding head end panel 54 and foot end panel 56 outwardly, moving first side panel 42 and second side panel 44 outwardly so that first and second side panels 42, 44 are spaced apart from one another, and causing bottom panel 36 and score line 58 formed thereon to move upwardly as shown in FIG. 1. It can also be seen, as described above, that inner box 12 is opened by folding each of the head and foot end panels 28, 30 and the first and second side panels 32, 34 upwardly. Thus, when inner box 12 moves to the generally planar configuration inner box 12 collapses outwardly and when outer box 14 moves to the generally planar configuration outer box 14 collapses inwardly.

When inner box 12 is received in outer box 14, inner box 12 cooperates with outer box 14 to hold both inner and outer boxes 12, 14 in their respective open positions. As described above, inner box 12 collapses outwardly when moving from the open configuration to the generally planar configuration with each of head and foot end panels 28, 30 and first and second side panels 32, 34 moving downwardly and outwardly relative to bottom panel 18. However, downward and outward movement of panels 28, 30, 32, 34 of inner box 12 push head and foot end panels 54, 56 and first and second side panels 42, 44 of outer box 14 outwardly to the open configuration of outer box 14.

Likewise, as described above, outer box 14 collapses inwardly when moving from the open configuration to the generally planar configuration with each of head and foot end panels 54, 56 folding inwardly and first and second side panels 42, 44 moving inwardly when end panels 54, 56 fold inwardly. However, the inward movement of panels 42, 44, 54, 56 of outer box 14 pushes head and foot end panels 28, 30 and first and second side panels 32, 34 of inner box 12 inwardly to the open configuration of inner box 12. Thus, inner and outer boxes 12, 14 cooperate with one another to hold each other in their respective open configurations. Although inner and outer boxes 12, 14 cooperate to hold one another in their respective open configurations, it is within the scope of the invention as presently perceived to provide fasteners that can be inserted through side panels 42, 44 of outer box 14 and side panels 32, 34 of inner box 12 to hold side panels 32, 42 and 34, 44 together.

Illustrative and preferred inner box 12 and outer box 14 are made from kraft paper. Although kraft paper is the preferred material from which inner and outer boxes 12, 14 are made, inner and outer boxes 12, 14 can be made from any suitable material that will operate to stabilize top and bottom surfaces 86, 88 of core 16, 116 without exceeding the scope of the invention as presently perceived. Core 16, 116 is adhered to inner and outer boxes 12, 14, which operate as first and second stabilizing surface elements, using any suitable adhesive. In addition, an aesthetically pleasing material (not shown) can be adhered to the outside of outer box 14 to provide casket shell 10 with a pleasing texture and appearance.

Core 16 is sandwiched between inner box 12 and outer box 14 as shown in FIG. 1. Core 16 includes a bottom panel 76 sandwiched between bottom panel 18 of inner box 12 and bottom panel 36 of outer box 14, a head end panel 78 sandwiched between head end panel 28 of inner box 12 and head end panel 54 of outer box 14, a foot end panel 80 sandwiched between foot end panel 30 of inner box 12 and foot end panel 56 of outer box 14, a first side panel 82 sandwiched between first side panel 32 of inner box 12 and first side panel 42 of outer box 14, and a second side panel 84 sandwiched between second side panel 34 of inner box 12 and second side panel 44 of outer box 14.

Each core panel 76, 78, 80, 82, 84 includes a top surface 86 and a bottom surface 88 as shown in FIG. 1, the phrase "top surface 86" representing the collective top surfaces of core panels 76, 78, 80, 82, 84 and the phrase "bottom surface 88" representing the collective bottom surfaces of core panels 76, 78, 80, 82, 84. Core 16 is preferably formed from polymer coated cellulose fiber (PCCF) but environmentally safe plastic or the like will also suffice. Core 16 is preferably comprised of a plurality of cylindrically-shaped elongated cells 90 interconnected and forming a honeycomb pattern as shown in FIG. 1. Because of the cylindrical shapes of cells 90, cells 90 have strong structural rigidity along their longitudinal axes. Preferred and illustrative core 16 is preferably similar to the core disclosed in U.S. patent application Ser. No. 08/495,323 to Tambussi, filed Jun. 27, 1995, the specification of which is hereby incorporated by reference, and U.S. patent application Ser. No. 08/589,822 to Tambussi, filed Jan. 22, 1996, the specification of which is hereby incorporated by reference.

Core 16 is sandwiched between and adhered to inner and outer boxes 12, 14 as shown in FIG. 1 so that core 16 and casket shell 10 has structural rigidity, attained by maintaining side walls of each cell 90 of core 16 in a substantially perpendicular orientation to forces that are applied thereto. Core 16 acts as a pressure transfer mechanism and transfers the load from inner box 12 to outer box 14 when a force is applied thereto. Thus, inner box 12 and outer box 14 operate as stabilizing surface elements that stabilize top surface 86 and bottom surface 88 of core 16 to maintain the substantially perpendicular orientation of the side walls of each cell 90 relative to the inner and outer boxes 12, 14 to provide structural rigidity to core 16, 116 and to casket shells 10, 210.

Casket shell 10 is assembled by folding outer box 14 to move outer box 14 from the generally planar configuration to the open configuration as shown in FIG. 1. An adhesive is applied to bottom panel 36 of outer box 14 and bottom panel 76 of core 16 is adhered thereto. Inner box 12 is folded to move inner box 12 from the generally planar configuration to the open configuration. Adhesive is applied to the underside of bottom panel 18 of inner box 12 and inner box 12 is nested within outer box 14 so that the adhesive adheres bottom panel 18 of inner box 12 to a top surface of bottom panel 76 of core 16. Adhesive is applied to the opposing surfaces of panels 28, 30, 32, 34 of inner box 12 and panels 42, 44, 54, 56 of outer box 14. Panels 78, 80, 82, 84 of core 16 are inserted therebetween and adhered thereto so that head end panel 78 of core 16 is sandwiched between and adhered to head end panel 28 of inner box 12 and head end panel 54 of outer box 14, foot end panel 80 of core 16 is sandwiched between and adhered to foot end panel 30 of inner box 12 and foot end panel 56 of outer box 14, first side panel 82 of core 16 is sandwiched between and adhered to first side panel 32 of inner box 12 and first side panel 42 of outer box 14, and second side panel 84 of core 16 is sandwiched between and adhered to second side panel 34 of inner box 12 and second side panel 44 of outer box 14. If desired, plastic rivets or other fasteners (not shown) can be used to secure outer box 14 relative to inner box 12 and core 16 without exceeding the scope of the invention as presently perceived.

Although the preferred and illustrative core 16 includes a plurality of cells 90 made from PCCF arranged in a honeycomb pattern, materials other than PCCF and patterns other than the honeycomb pattern can be used. For example, core 16 can be made from an environmentally safe polystyrene-type material, in lieu of the honeycomb material, where the polystyrene-type material is placed between two stabilizing surface elements. Polystyrene foam placed between stabilizing surface elements exhibits substantially the same structural rigidity as the honeycomb portions and can be used interchangeably. Additionally, PCCF and other materials can be formed into truss patterns which also exhibit high structural rigidity when sandwiched between the stabilizing surface elements.

Figure 2:
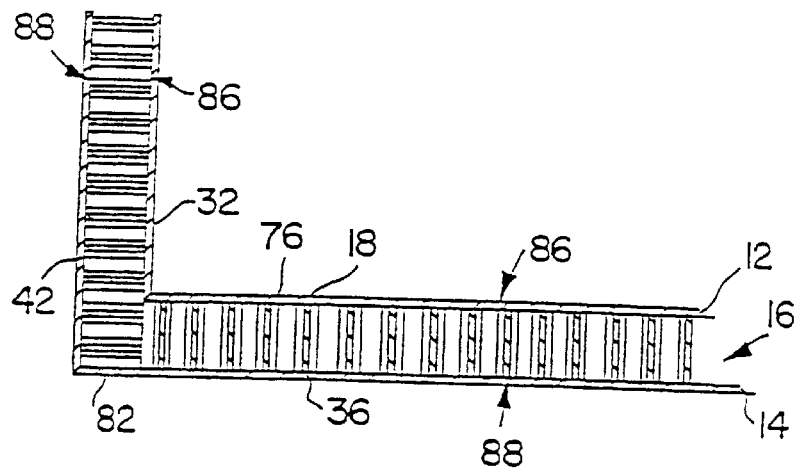
FIG. 2 is a sectional view taken along line 2—2 of FIG. 1 showing a portion of the outer box, a portion of the inner box received within a space defined by the outer box, and a portion of the bottom panel of the honeycomb core abutting a portion of the side panel of the honeycomb core.
Figure 3:
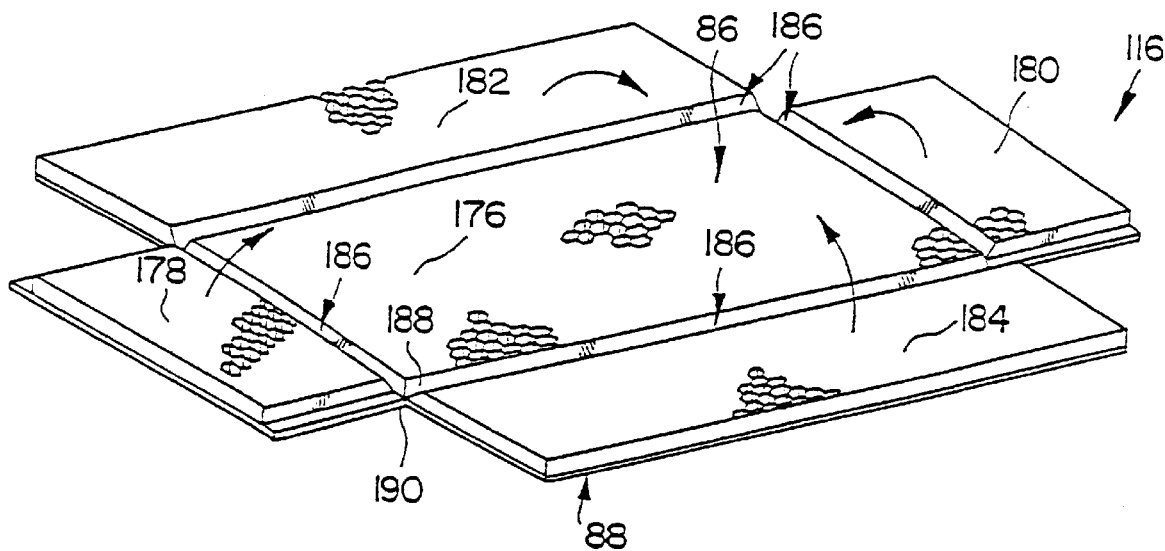
FIG. 3 is a perspective view of a honeycomb core in which the bottom panel, the head and foot end panels, and the first and second side panels of the honeycomb core are combined in a unitary sheet having elongated V-shaped grooves extending between the panels of the core to facilitate folding of the core so that the core fits in the space defined between the inner and outer boxes.
Figure 4:
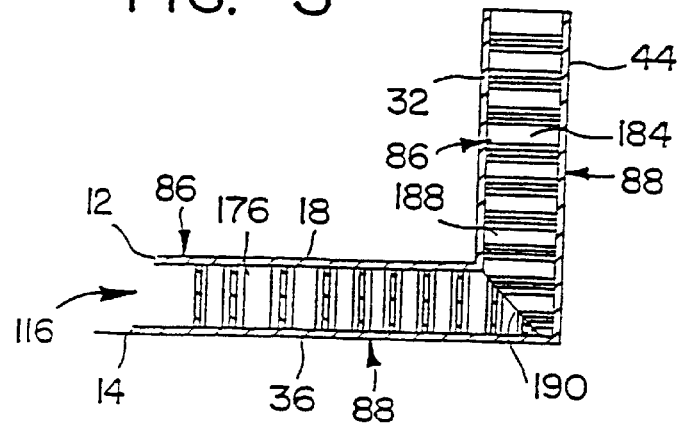
FIG. 4 is a view similar to FIG. 2 showing the casket shell made using the unitary honeycomb core and showing a side of the bottom panel defining the V-shaped groove abutting a side of the side panel defining the V-shaped groove after the unitary core is folded.

Bottom panel 76 of core 16 abuts first side panel 82 of core 16 as shown best in FIG. 2. However, if desired, a unitary core 116 may be used in place of core 16. Unitary core 116 is of unitary construction and includes an elongated bottom panel 176, a head end panel 178 appended to bottom panel 176, a foot end panel 180 appended to bottom panel 176 and longitudinally spaced apart from head end panel 178, a first side panel 182 appended to bottom panel 176, and a second side panel 184 appended to bottom panel 176 and transversely spaced-apart from first side panel 182 as shown in FIG. 3. In preferred embodiment, unitary core 116 is provided with a plurality of V-shaped grooves extending between bottom panel 176 and each of head end panel 178, foot end panel 180, first side panel 182, and second side panel 184. Forming unitary core 116 to include V-shaped grooves 186 facilitates folding panels 178, 180, 182, 184 upwardly relative to bottom panel 176 so that unitary core 116 can be shaped to fit in the space defined between inner box 12 and outer box 14 and can be sandwiched between outer box 14 and inner box 12. A portion of casket shell 10 including inner box 12, outer box 14, and unitary core 116 is shown in FIG. 4 which shows a first side 188 of bottom panel 176 of core 116 defining V-shaped groove 186 in abutting relation with a second side 190 of side panel 184 of core 116 defining V-shaped groove 186.

Figure 5:
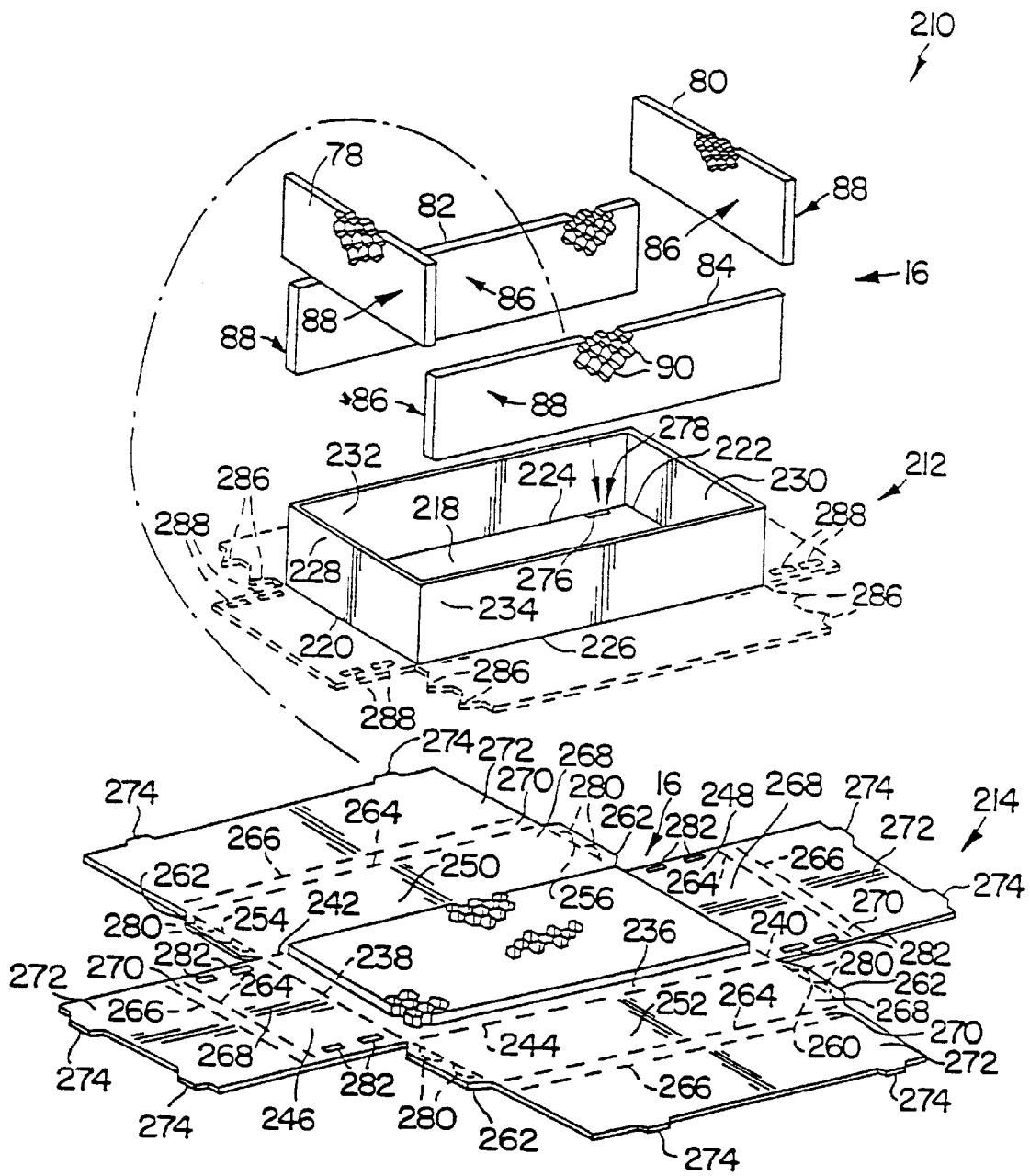
FIG. 5 is a view similar to FIG. 1 of a second embodiment of a casket shell structure in accordance with the present invention showing the inner box being formed to include a plurality of slots and showing a plurality of tabs formed on the outer box and positioned to be received by the slots of the inner box upon assembly of the casket shell.
Figure 6:
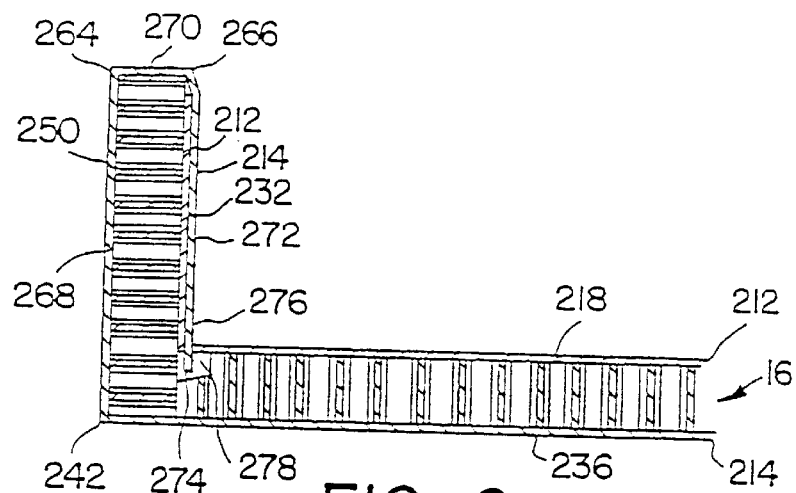
FIG. 6 is a view similar to FIG. 4 of the casket shell structure of FIG. 5 showing a first side panel of the outer box engaging a first side panel of the core and wrapping around the core to engage a first side panel of the inner box and a tab on the first side panel of the outer box being received by a slot formed in the bottom panel of the inner box.
Figure 7:
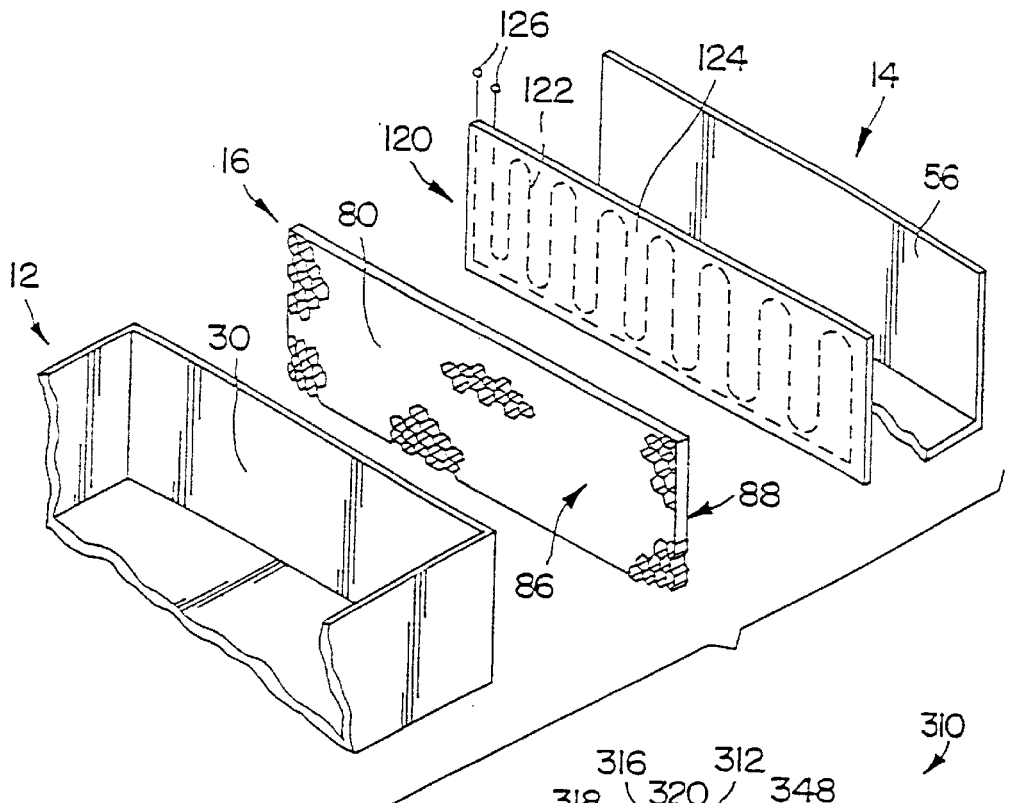
FIG. 7 is an exploded perspective view of a casket shell structure showing an inner box, an outer box, a core panel sandwiched therebetween, and an adhesive blanket including a wire mesh which is coated by a thermally-activated adhesive, the adhesive blanket illustratively being positioned to lie between the core panel and the outer box so that when an electrical current travels through the wire mesh, the wire mesh heats the thermally-activated adhesive so that the adhesive is activated to adhere the bottom surface of the core to the outer box.

A second embodiment of a casket shell 210 in accordance with the present invention includes an inner box 212, an outer box 214, and a core 16, 116 sandwiched therebetween as shown in FIGS. 5 and 6. Inner box 212 includes a bottom panel 218 having a head end edge 220, a foot end edge 222, a first side edge 224, and a second side edge 226 as shown in FIG. 5. Inner box 212 also includes a head end panel 228 appended to bottom panel 218 at head end edge 220, a foot end panel 230 appended to bottom panel 218 at foot end edge 222, a first side panel 232 appended to bottom panel 218 at first side edge 224, and a second side panel 234 appended to bottom panel 218 at second side edge 226. In preferred embodiments, inner box 212 assumes a generally planar configuration defining a generally planar blank that can be formed into inner box 212 to minimize the volume of inner box 212 during shipment. Inner box 212 is moved from the generally planar configuration (in phantom) to an open configuration by folding each of the head and foot end panels 228, 230 and the first and second side panels 232, 234 upwardly along score lines defined at edges 220, 222, 224, 226.

Outer box 214 includes a bottom panel 236 having a head end edge 238, a foot end edge 240, a first side edge 242, and a second side edge 244 as shown in FIG. 5. Outer box 214 also includes a head end panel 246 appended to bottom panel 236 at head end edge 238, a foot end panel 248 appended to bottom panel 236 at foot end edge 240, a first side panel 250 appended to bottom panel 236 at first side edge 242, and a second side panel 252 appended to bottom panel 236 at second side edge 244. In preferred embodiments, outer box 214 assumes a generally planar configuration defining a generally planar blank that can be formed into outer box 214 to minimize the volume of outer box 214 during shipment. Outer box 214 is moved from the generally planar configuration to an open configuration, as shown in FIG. 6, by folding each of the head and foot end panels 246, 248 and the first and second side panels 250, 252 upwardly along score lines defined at edges 238, 240, 242, 244.

First side panel 250 includes a head end edge 254 and a foot end edge 256. Second side panel 252 likewise includes a head end edge 258 and a foot end edge 260. A pair of flaps 262 are appended to each of first and second side panels 250, 252 with a flap 262 appended to first side panel 250 at head end edge 254, a flap 262 appended to first side panel at foot end edge 256, a flap 262 appended to second side panel 252 at head end edge 258, and a flap 262 appended to second side panel 252 at foot end edge 260 as shown in FIG. 5. When the blank that can be formed into outer box 214 is moved to the open configuration to form outer box 214, flaps 262 are folded along edges 254, 256, 258, 260 so that flaps 262 engage the adjacent head end panel 246 and foot end panel 248. Flaps 262 are preferably adhered to the respective head and foot end panels 246, 248 to hold outer box 214 in the open configuration.

Each of head and foot end panels 246, 248 and first and second side panels 250, 252 of outer box 44 are formed to include an inner score line 264 and an outer score line 266 as shown in FIG. 5. Inner and outer score lines 264, 266 divide each panel 246, 248, 250, 252 into an outer panel portion 268, a top panel portion 270, and an inner panel portion 272 as shown in FIGS. 5 and 6. When casket shell 210 is assembled, each panel 246, 248, 250, 252 of illustrative and preferred outer box 214 is folded upwardly along its respective edge 238, 240, 242, 244 so that outer panel portion 272 of each panel 246, 248, 250, 252 of outer box 214 engages bottom surface 88 of the corresponding panel 78, 80, 82, 84 of core 16.

In addition, each panel 246, 248, 250, 252 is wrapped around its respective panel 78, 80, 82, 84 of core 16 by folding each panel 246, 248, 250, 252 along inner score line 264 and along outer score line 266 so that top panel portion 270 of each panel 246, 248, 250, 252 engages a top of the corresponding core panel 78, 80, 82, 84 and inner panel portion 272 of each panel 246, 248, 250, 252 of outer box 214 engages the corresponding panel 228, 230, 232, 234 of inner box 212. For example, as shown in FIG. 6 for first side panel 250, outer panel portion 268 of first side panel 250 engages bottom surface 88 of core 16, top panel portion 270 of first side panel 250 engages a top of core 16, and inner panel portion 272 of first side panel 250 engages first side panel 232 of inner box 212.

Each of head and foot end panels 246, 248 and first and second side panels 250, 252 of outer box 214 are provided with a plurality of outwardly extending tabs 274 as shown in FIGS. 5 and 6. In addition, bottom panel 218 of inner box 212 includes a plurality of edges 276 defining a plurality of slots 278 formed in bottom panel 218. When preferred and illustrative casket shell 210 is assembled, tabs 274 are received in slots 278 so that tabs 274 cooperate with edges 276 of bottom panel 218 to assist with keeping inner panel portions 272 of panels 246, 248, 250, 252 of outer box 214 in engagement with the corresponding panels 228, 230, 232, 234 of inner box 212 to provide additional structural integrity to assembled casket shell 210.

If desired, outer box 214 can be provided with outwardly extending "hidden tabs" 280 positioned adjacent to flaps 262 as shown in FIG. 5. When casket shell 210 is assembled, hidden tabs 280 cooperate with corresponding slots 282 formed on outer portion 268 of head end panel 246 and outer portion 268 of foot end panel 248 to assist with keeping outer panel portions 268 of panels 246, 248, 250, 252 of outer box 214 in engagement with the corresponding panels 228, 230, 232, 234 of inner box 212 to provide additional structural integrity to assembled casket shell 210.

In addition, inner box 212 can be provided with outwardly extending tabs 286 (in phantom) on first and second side panels 232, 234 and head and foot end panels 228, 230 can be formed to include slots 288 (in phantom) as shown in FIG. 5. Prior to joining inner box 212, outer box 214, and core 16 of casket shell 210, inner box 212 can be shaped and tabs 286 can be received by corresponding slots 288 during a "preassembly" step to assist with retaining the shape of inner box 212 during the assembly of casket shell 210.

As described above, flaps 262 of outer box 214 can be adhered to outer panel portions 268 of each of head end panel 246 and foot end panel 248. In addition, outer panel portions 268 of each panel 246, 248, 250, 252 of outer box 214 are adhered to bottom surfaces 88 of the corresponding panels 78, 80, 82, 84 of core 16, respectively, and inner panel portions 272 of panels 246, 248, 250, 252 of outer box 214 can be adhered to panels 228, 230, 232, 234 of inner box 212, respectively.

Illustrative core 16 of casket shell 210 includes separate panels 76, 78, 80, 82, 84 including honeycomb material as shown in FIG. 5. Although illustrative casket shell 210 includes core 16 having separate panels, casket shell 210 can be constructed using unitary core 116 shown in FIG. 3 having bottom panel 176, head end panel 178, foot end panel 180, first side panel 182, and second side panel 184 which are of unitary construction. In addition, if desired, casket shell 210 can be constructed including a core made from a closed-celled material such as polystyrene foam as described above rather than using an open-celled material as illustratively shown in FIGS. 5 and 6.

Illustrative and preferred inner boxes 12, 212 are preferably made from kraft paper and folded from generally planar blanks to the respective open positions shown in FIGS. 1 and 5. However, inner boxes 12, 212 can be made from other materials without exceeding the scope of the invention as presently perceived. For example, inner boxes 12, 212 can be made from a vacuum-formed plastics material adhesively bonded to core 16, 116. Vacuum-formed inner boxes 12, 212 made from plastics materials can be formed having relatively thin walls since forces applied thereto would be transferred through core 16, 166 to outer boxes 14, 214. In addition, vacuum-formed inner boxes 12, 212 are waterproof thus preventing liquids from leaking out of casket shell 210 from the interior region of inner boxes 12, 212.

If desired, casket shell 10 or casket shell 210 including either core 16 or core 116 can be assembled using an adhesive blanket that is positioned to lie between core 16, 116 and either one or both of inner box 12, 212 and outer box 14, 214. Adhesive blanket 120 is illustratively shown in FIG. 7 sandwiched between front end panel 80 of core 16 and foot end panel 56 of outer box 14. Illustrative and preferred adhesive blanket 120 includes a wire mesh 122 supporting a thermally-activated adhesive 124. When thermally-activated adhesive 124 is heated to a temperature greater than a predetermined threshold temperature, thermally-activated adhesive 124 is activated so that thermally-activated adhesive 124 will adhere foot end panel 80 of core 16 to foot end panel 56 of outer box 14. Wire mesh 122 also includes a pair of electrodes 126. When an electrical current is passed through wire mesh 122 across electrodes 126, the temperature of wire mesh 122 will increase. Once the temperature of wire mesh increases sufficiently to increase the temperature of thermally-activated adhesive 124 above the threshold activation temperature of thermally-activated adhesive 124, adhesive 124 will hold bottom surface 88 of foot end panel 80 of core 16 to foot end panel 56 of outer box 14.

It will be understood by those skilled in the art that adhesive blanket 122 can be used to adhere any of panels 76, 78, 80, 82, 84 of core 16 or panels 176, 178, 180, 182, 184 of core 116 to inner box 12, 212 or outer box 14, 214. In addition, although cores 16, 116 of illustrative and preferred casket shells 10, 210 are adhered to inner and outer boxes 12, 212, 14, 214 using adhesive blanket 120, it is within the scope of the invention as presently perceived to adhere cores 16, 116 to inner and outer boxes 12, 212, 14, 214 using any suitable adhesive or method for joining cores 16, 116 to inner and outer boxes 12, 212, 14, 214 so long as inner and outer boxes 12, 212, 14, 214 operate as stabilizing surface elements stabilizing surfaces 86, 88 of cores 16, 116.

An illustrative third embodiment of a casket shell 310 in accordance with the present invention includes a plurality of generally planar panels 312, 313 and a plurality of connectors 314, as shown in FIG. 8, that cooperate to define casket shell 310. Each casket shell panel 312, 313 includes a first stabilizing surface element 318, a second stabilizing surface element 320 spaced apart from first stabilizing surface element 318, and a core 316 sandwiched therebetween. Core 316 of each panel 312, 313 is similar to panels 76, 78, 80, 82, 84 of core 16. First and second stabilizing surface elements 318, 320 are adhered to top and bottom surfaces 386, 388 of core 316, respectively, so that casket shell panels 312, 313 are rigid.

Each connector 314 includes an elongated first portion 326 and an elongated second portion 328 connected to first portion 326 as shown in FIG. 8. In illustrative and preferred casket shell 310, first portion 326 is fixed to second portion 328 as shown in FIG. 8, however first portion 326 can be hinged to second portion 328 so that a first panel 312 connected to first portion 326 can pivot relative to a second panel 313 connected to second portion 328.

Each portion 326, 328 of connectors 314 includes an elongated base 330 and elongated first and second prongs 332, 334 extending upwardly from base 330 to a distal end 336, 338, respectively. An elongated barb 340, 342 extends inwardly from each distal end 336, 338 of prongs 332, 334.

Preferably, a web 350 connects base 330 of first portion 326 to base 330 of second portion 328.

Base 330 cooperates with first prong 332 and second prong 334 of each portion 326, 328 of connectors 314 to define a pair of panel-receiving channels 344, 346 therebetween as shown in FIG. 8. Each panel 312, 313 is received in one of panel-receiving channels 344, 346 to attach connector 314 to panels 312, 313 as illustratively shown in FIG. 8. If desired, panels 312, 313 can be formed to include grooves 348 for receiving barbs 340, 342. When panels 312, 313 are received in panel-receiving channels 344, 346, panels 312, 313 are coupled to one another. If desired, base 330 of first portion 326 can be pivotably coupled to base 330 of second portion 328 so that first portion 326 can pivot relative to second portion 328 allowing casket shell panel 312 to pivot relative to casket shell panel 313. It can be seen that completed casket shell 310 having a bottom panel, a head end panel pivotably coupled to the bottom panel by connector 314, a foot end panel pivotably coupled to the bottom panel by connector 314, a first side panel pivotably coupled to the bottom panel, the head end panel, and the foot end panel by connectors 314, and a second side panel pivotably coupled to the bottom panel, the head end panel, and the foot end panel by connectors 314 will be a rigid casket shell 310 having the bottom panel, the head end panel, the foot end panel, the first side panel, and the second side panel rigidly connected to one another.

Preferred connectors 314 are extruded and are made from plastics materials, although connectors can be formed from any material including aluminum or other metals that can be readily and easily extruded without exceeding the scope of the invention as presently perceived. In addition, connectors 314 can be molded or formed from any suitable material using any suitable process that will result in connectors substantially similar to connectors 314 described herein without exceeding the scope of the invention as presently perceived.

A fourth embodiment of the casket shell 410 in accordance with the present invention, illustratively shown in FIG. 10, is made from a casket shell precursor 414 shown in FIGS. 9 and 10. Casket shell precursor 412 includes a first panel 414 having a top surface 416 and a bottom surface 418 and a second panel 420 having a top surface 422 and a bottom surface 424 as shown best in FIG. 9. First panel 414 is attached to second panel 420 so that top surface 416 of first panel 414 is adjacent to bottom surface 424 of second panel 420. First and second panels 414, 420 are attached to one another by a longitudinally-extending first strip of adhesive 426 adhered to a first side 428 of first panel 414 and adhered to a first side 430 of second panel 420 and a longitudinally-extending second strip of adhesive 432 adhered to a second side 434 of first panel 414 and to a second side 436 of second panel 420.

Casket shell precursor 412 includes first and second sides 440. First side 440 of casket shell precursor 412 includes first side 428 of first panel 414, first side 430 of second panel 420, and first strip of adhesive 426. Second side 440 of casket shell precursor 412 includes second side 434 of first panel 414, second side 436 of second panel 420, and second strip of adhesive 432. Top surface 416 of first panel 414 cooperates with bottom surface 424 of second panel 420 and sides 440 of casket shell precursor 412 to define an interior region 438 of casket shell precursor 412.

Each panel 414, 420 extends longitudinally and can extend for a distance of several times the length of casket shell 410 so that casket shell precursor 412 can be used to produce a plurality of casket shells 410 as shown diagrammatically in FIG. 10. Each panel 414, 420 includes a longitudinally-extending first stabilizing surface element 444, a longitudinally-extending second stabilizing surface element 446 spaced apart from first stabilizing surface element 444, and a longitudinally-extending core 448 sandwiched therebetween. Just as cores 16, 116, 316 of first, second, and third embodiments of casket shell 10, 210, 310 described above, core 448 can be made from either a closed-celled material such as polystyrene foam or from an open-celled material such as the honeycomb material described above. In addition, first and second stabilizing surface elements 444, 446 are preferably made from kraft paper although first and second stabilizing surface elements 444, 446 can be made from any suitable material that can be adhered to core 448 to stabilize the surfaces of core 448 adhered to first and second stabilizing surface elements 444, 446.

Core 448 of each panel 414, 420 of casket shell precursor 412 is loosely coupled to each of first and second stabilizing surface elements 444, 446. Preferably, core 448 is adhered to first and second stabilizing surface elements 444, 446 at only selected and isolated spots adjacent to sides 440 of casket shell precursor 412. This construction allows each of first and second panels 414, 420 to flex relative to one another.

An adhesive layer is positioned to lie between core 448 and first and second stabilizing surface elements 444, 446 of each of first and second panels 414, 420, however, the adhesive needs to be activated before the adhesive will adhere core 448 to first and second stabilizing surface elements 444, 446. Once the adhesive is activated, panels 414, 420 will be rigid. Preferably, the adhesive is adhered to the first and second stabilizing surface elements 444, 446 of precursor 412 but not to core 448 so that activation of the adhesive will cause the adhesive to adhere to core 448 and adheres core 448 to first and second stabilizing surface elements 444, 446. Thus, first and second panels 414, 420 can be shaped to a desired shape and then the adhesive can be activated so that first and second stabilizing surface elements 444, 446 adhere to core 448 causing first and second panels 414, 420 to become rigid and to retain the shape achieved when the adhesive was activated. In preferred embodiments, the adhesive is a thermally-activated adhesive, although adhesives activated by other activating techniques, such as a U.V. sensitive adhesive that is activated upon exposure to ultraviolet light can be used without exceeding the scope of the invention as presently perceived.

Casket shell 410 can be formed from casket shell precursor 412 using a process as illustratively shown in FIG. 10. Casket shell 410 is formed by shaping a portion of casket shell precursor 412, curing the shaped portion of casket shell precursor 412, dividing casket shell precursor 412 to form shaped units 456 having a desired length 458, removing sides 440 from shaped unit 456 to form a pair of opposing shell portions 460, and installing end caps 462 onto shell portions 460.

Casket shell precursor 412 can be shaped by inserting a form 466 into interior region 438 of casket shell precursor 412 as shown diagrammatically in FIG. 10. Preferred and illustrative form 466 is tapered and includes a tongue 468 that initially enters interior region 438, a tapered expander portion 470, and a shaping portion 472, the cross-section of which is the shape of the interior region of two opposing casket shells 410. Thus, by sliding form 466 into interior region 438 of casket shell precursor 412, casket shell precursor 412 is expanded by expander portion 470 and shaped by shaping portion 472 to the size and shape of a pair of opposing casket shells 410. If desired, form 466 can be a portable form that travels with casket shell precursor 412 through the curing step, or, preferably, form 466 is a stationary form and casket shell precursor 412 slides along form 466 through a curing station 474 through which a portion of shaping portion 472 of form 466 extends as shown diagrammatically in FIG. 10.

Preferred curing station 474 is an oven which is maintained at a temperature that is sufficiently high to heat the thermally-activated adhesive between core 448 and first and second stabilizing surface elements 444, 446 of first and second panels 414, 420 sufficiently to activate the adhesive. Although preferred adhesive is a thermally-activated adhesive and preferred curing station 474 is an oven, as described above the adhesive can be any suitable adhesive that can be activated by performing a physical process thereon and the curing station 474 can be any suitable station for performing the activity upon casket shell precursor 412. For example, the adhesive can be a U.V.-activated adhesive and curing station 472 can include a source of ultraviolet light that acts on casket shell precursor 412 to cure the adhesive, without exceeding the scope of the invention as presently perceived.

After casket shell precursor 412 is cured, first and second panels 414, 420 are rigid and assume the shape of shaping portion 472 of form 466 as shown diagrammatically in FIG. 10. Casket shell precursor 412 can thus be removed from form 466 and casket shell precursor 412 will retain the shape of shaping portion 472 of form 466. Cured casket shell precursor 412 can be divided into a plurality of shaped units 456 having a length 458 and which will retain the shape of form 466. Length 458 should correspond to a desired length of casket shell 410.

After shaped unit 456 is cut from cured casket shell precursor 412, sides 440 can be removed from shaped unit 456 as illustratively shown in FIG. 10. As described above, first side 440 includes first side 428 of first panel 414, first side 430 of second panel 420, and first strip of adhesive 426. Second side 440 includes second side 434 of first panel 414, second side 436 of second panel 420, and second strip of adhesive 432. Thus, by removing sides 440, first and second panels 414, 420 can be separated so that each of first and second panels 414, 420 defines a shell portion 460.

An end cap 462 can be installed onto each end of each shell portion 460 to complete the assembly of casket shell 410 as illustratively shown in FIG. 10. Preferably, each end cap 462 includes a first stabilizing surface element, a second stabilizing surface element spaced apart from the first stabilizing surface element, and a core sandwiched therebetween. Although preferred end caps 462 are of the type described above, end caps 462 can be made from any suitable material such as wood, cardboard, metal, or any other suitable material for use in constructing casket shell 410 without exceeding the scope of the invention as presently perceived.

As will be understood by those skilled in the art, casket shell precursor 412 can be formed as an elongated strip that can be used in a continuous process for forming casket shells 410 as illustratively shown in FIG. 10. Also, if desired, casket shell precursor 412 can be an elongated precursor of length 458 of a single casket shell 410 and can be processed one at a time or using a batch process as opposed to a continuous process but including the steps described above with respect to FIG. 10. It will be understood by those skilled in the art that although the process described above with reference to FIG. 10 is useful for producing casket shells 410, lids (not shown) for casket shells 410 can be produced by the same method using an appropriate-sized precursor and an appropriately-shaped form. Thus, casket shell precursor 412 provides an inexpensive and easy-to-implement method for producing casket shells 410 and lids from casket shell precursors 412.

Although the invention has been described in detail with reference to preferred embodiments, additional variations and modifications exist within the scope and spirit of the invention as described and defined in the following claims.

I claim:

1. A casket shell comprising
   an elongated inner box of unitary construction including a generally horizontal bottom having a head end edge, a foot end edge longitudinally spaced apart from the head end edge, spaced-apart first and second side edges extending longitudinally therebetween, and head end, foot end, first side, and second side panels integrally appended to the head end, foot end, first side, and second side edges, respectively, and extending upwardly therefrom,
   an elongated outer box of unitary construction including a generally horizontal bottom having a longitudinally-extending first side edge and a longitudinally-extending second side edge spaced apart from the first side edge, first and second side panels appended to the first and second side edges of the bottom, respectively, and extending upwardly therefrom, each of the first and second side panels of the outer box having a head end edge and a foot end edge, a head end panel integrally appended to the head end edges of each of the first and second side panels and extending therebetween, and a foot end panel integrally appended to the foot end edges of each of the first and second side panels and extending therebetween, the bottom, first and second side panels, and head and foot end panels of the outer box defining an interior region of the outer box, the inner box being congruently disposed the interior region of the outer box, and
   a core sandwiched between the inner box and the outer box, the core including a top surface attached to the inner box and a bottom surface attached to the outer box.

2. The casket shell of claim 1, wherein each of the head and foot end panels of the outer box are formed to include a generally vertically-extending score line so that the head and foot end panels can be folded along the score lines.

3. The casket shell claim 2, wherein the bottom of the outer box is formed to include a longitudinally-extending score line so that the bottom can be folded along the score line.

4. The casket shell of claim 1, wherein the bottom, the head end, the foot end, the first side, and the second side panels of the inner box and the bottom, the first and second side panels, and the head and foot end panels of the outer box are each formed from kraft paper panels.

5. The casket shell of claim 1, wherein the core comprises an open-celled material.

6. The casket shell of claim 5, wherein each cell of the open-celled material includes a wall that is positioned to lie in orthogonal relation to the walls of the inner and outer boxes engaging the wall of the cell.

7. The casket shell of claim 6, wherein the cells are cylindrically-shaped cells and the core includes a plurality of such cells interconnected and forming a honeycomb pattern.

8. The casket shell of claim 1, wherein the core comprises a closed-celled material.

9. The casket shell of claim 8, wherein the closed-celled material is polystyrene foam.

10. The casket shell of claim 1, wherein the core includes a bottom core panel sandwiched between the bottom panel of the inner box and the bottom panel of the outer box, a head end core panel sandwiched between the head end panel of the inner box and the head end panel of the outer box, a foot end core panel sandwiched between the foot end panel of the inner box and the foot end panel of the outer box, a first side core panel sandwiched between the first side panel of the inner box and the first side panel of the outer box, and a second side core panel sandwiched between the second side panel of the inner box and the second side panel of the outer box.

11. The casket shell of claim 10, wherein the core is of unitary construction.

12. The casket shell of claim 11, wherein the core is made from a generally planar unitary core formed to include a plurality of elongated V-shaped grooves extending between the bottom core panel and each of the first and second side core panels and the head and foot end core panels so that the unitary core can be shaped to fit in a space defined between the inner box and the outer box.

13. A casket shell comprising an inner box, an outer box, and a core sandwiched therebetween, the core having a shape corresponding to the shape of the inner box and the shape of the outer box, the core including an inner surface and an outer surface spaced apart from the inner surface, the inner box being adhered to the inner surface of the core and the outer box being adhered to the outer surface so that pressure is transferred from the inner box to the outer box when a force is applied to the inner box.

14. The casket shell of claim 13, wherein the inner box is of unitary construction and includes a generally planar and elongated bottom including a head end edge, a foot end edge longitudinally spaced apart from the head end edge, and first and second longitudinally-extending spaced-apart side edges extending therebetween, and head end and foot end panels being appended to the bottom panel at the head end and foot end edges, respectively, and extending upwardly therefrom, and first and second side panels appended to the first and second side edges, respectively, and extending upwardly therefrom.

15. The casket shell of claim 13, wherein the core comprises an open-celled material.

16. A casket shell comprising an inner box having a bottom panel, first and second end panels attached to the bottom panel and extending upwardly therefrom, and first and second longitudinally-extending side panels attached to the bottom panel and extending upwardly therefrom, a core having an outer surface and an inner surface spaced apart from the outer surface and attached to the inner box, and an outer box attached to the outer surface of the core, the outer box including first and second end panels engaging the core and engaging the first and second end panels of the inner box, respectively, and head and foot end panels engaging the core and engaging the head and foot end panels of the inner box, respectively.

17. The casket shell of claim 16, wherein the inner box is formed to include the plurality of slots and the head end, foot end, first side, and second side panels are each formed to include a tab, each tab being received by an associated slot of the plurality of slots.

18. A casket shell comprising a plurality of generally planar panels, each panel including a core having a top surface and a bottom surface spaced apart from the top surface, a first stabilizing surface element attached to the bottom surface, and a second stabilizing surface element attached to the top surface, and a plurality of connectors, each connector coupling two panels of the plurality of panels to one another, the plurality panels cooperating with the plurality of connectors to define the casket shell.

19. A casket shell of claim 18, wherein each connector includes an elongated first portion having a base and first and second spaced-apart upstanding prongs appended to the base so that the first portion has a cross-section that is generally U-shaped.

20. The casket shell of claim 19, wherein each upstanding prong further includes a barb spaced-apart from the base and extending in a direction toward the opposing prong.

21. The casket shell of claim 19, wherein each connector includes an elongated second portion having a base and first and second spaced-apart upstanding prongs appended to the base of the second portion so that the second portion has a cross-section that is generally U-shaped, the base of the first portion being coupled to the base of the second portion.

22. The casket shell of claim 21, wherein the base of the first portion is fixed to the base of the second portion and is positioned to lie in orthogonal relation thereto so that a transverse cross-section therethrough is generally L-shaped.

23. The casket shell of claim 21, wherein the base of he first portion is pivotably coupled to the base of the second portion along a longitudinally-extending pivot axis defined therebetween so that the panels coupled by the connector can pivot relative to one another.

24. The casket shell of claim 18, wherein each connector includes a first portion fixed relative to a first panel of the plurality of panels and a second portion fixed relative to a second panel of the plurality of panels.

25. The casket shell of claim 24, wherein the first portion is pivotably coupled to the second portion so that the first panel can pivot relative to the second panel.

* * * * *